Feb. 21, 1956    M. J. KARR    2,735,685
CHUCK FOR JIG SAWS OR THE LIKE
Filed Oct. 26, 1951
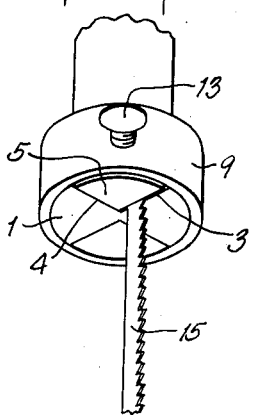
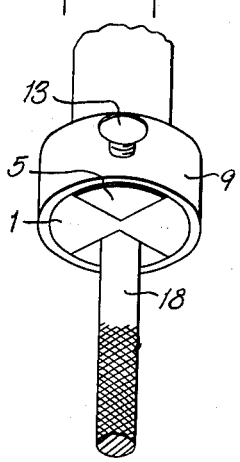
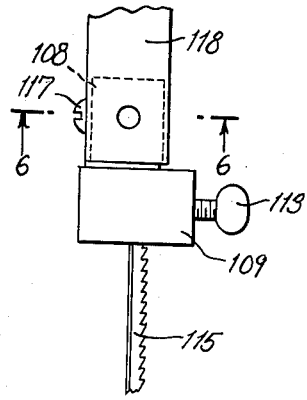
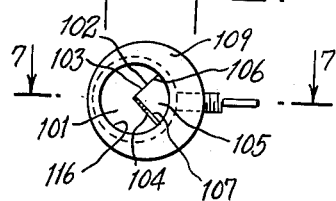
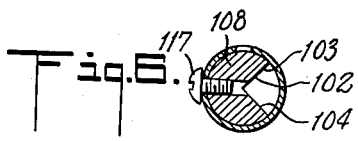
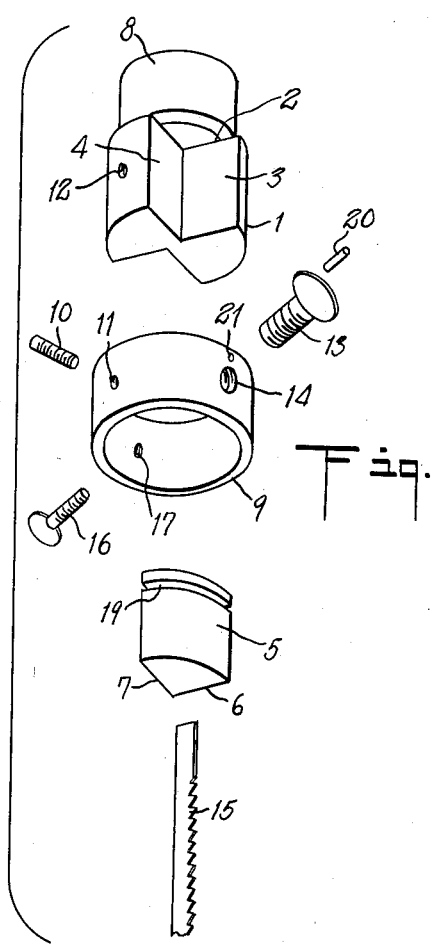
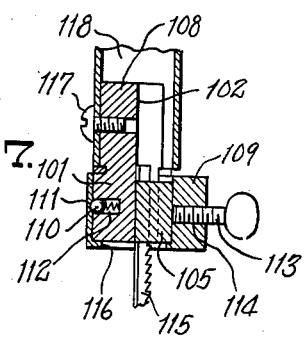
INVENTOR.
MICHAEL JOSEPH KARR
BY
Kenyon & Kenyon
ATTORNEYS

United States Patent Office 2,735,685
Patented Feb. 21, 1956

2,735,685

CHUCK FOR JIG SAWS OR THE LIKE

Michael Joseph Karr, Kalamazoo, Mich., assignor to Atlas Press Company, Kalamazoo, Mich., a corporation of Michigan Application October 26, 1951, Serial No. 253,355

4 Claims. (Cl. 279—44)

This invention relates to chucks for jig saws or the like. Heretofore various means have been provided for indexing the saw blade 90°. Many of such means have been complicated and expensive.

One of the objects of this invention is to provide a chuck in which adjustment may be easily and simply made.

Another object is to provide such a chuck which is inexpensive and can be placed on low-priced saws or the like.

Another object is to provide such a chuck which is universal and may be used for chucking either saws or files without expensive adjustment.

Other objects and advantages of the invention will be apparent from the following specification and the accompanying drawings, in which:

Fig. 1 is a perspective view of one form of the improved chuck with a saw blade chucked therein;

Fig. 2 is a similar view of the chuck shown in Fig. 1 with a file chucked therein;

Fig. 3 is a view showing the parts of the chuck in its assembled relationship;

Fig. 4 is an elevational view of another form of the invention;

Fig. 5 is a bottom plan view of the form of chuck shown in Fig. 4;

Fig. 6 is a detailed sectional view taken on the line 6—6 of Fig. 4, and

Fig. 7 is a detailed sectional view taken on the line 7—7 of Fig. 5.

The chuck shown in Figs. 1-3 consists of a chuck body 1 which is generally cylindrical in form. It is provided with a longitudinally-extending notch 2 which is formed by substantially radially-extending walls 3 and 4 which extend from substantially the center of the chuck body to the periphery thereof. Fitted within this notch is a chuck jaw 5, which is in the form of a segment of a cylinder having walls 6 and 7 at right angles thereto. This jaw, when assembled with the chuck body, fits in the notch 2 substantially forming a cylinder. The shank 8 serves to attach the chuck to a reciprocating plunger which is not shown.

A ring 9 loosely surrounds the chuck body 1 and the jaw 5. It is retained in place by means of a screw 10 which is threaded in the aperture 11 in the ring 9 and the aperture 12 in the chuck body. A screw 13 is screw threaded in the aperture 14 in the ring opposite the notch 2. The screw is adapted to bear against the jaw 5 to force it into wedging engagement in the notch so that a saw blade 15 may be chucked. It will be obvious to those skilled in the art that the saw blade may be chucked as shown in Fig. 1 between the jaw 5 and the wall 3 or it may be chucked between the jaw 5 and the wall 4 to give 90° adjustment to the blade.

Diametrically opposite the notch 2 is a notch 15. A screw 16 is screw threaded in the aperture 17 in the ring to serve to chuck a file or similar tool 18 as shown in Fig. 2, the V walls of the notch 15 serving to clamp the file in substantially central position.

The jaw 5 may be retained within the ring and in clamping position by various means. The means shown consist of a circumferential groove 19 surrounding the chuck. A pin 20 extending through the aperture 21 in the ring fits in this groove and loosely supports the jaw 5 in position.

In the form of invention shown in Figs. 4-7 the chuck body is shown at 101. It is generally cylindrical in form and is provided with a notch 102 substantially the same as the notch 2, it being provided with walls 103 and 104. The jaw 105 is similar to the jaw 5 heretofore described, it being provided with faces 106 and 107 at 90° to one another. The shank 108 is provided for attaching the body to a suitable plunger. A cup 109 is provided, which surrounds the chuck body 101 and the jaw 105. It is removably retained in position by a spring-pressed ball 110 which seats in the recess 111 in the cup and is normally disposed in the recess 112 in the chuck body.

A screw 113 is screw threaded in the aperture 114 in the wall of the cup and serves to force the jaw 105 into the notch 102 to clamp a saw 115 just as the saw 15 is clamped in the notch 2 of the chuck shown in Figs. 1-3. The cup is apertured at 116 with an aperture which registers with the chuck body and the jaw but is smaller in diameter than the cylinder formed by them so as to retain the jaw 105 loosely in position in the notch 102. A screw 117 is employed to hold the chuck in position on the tube or plunger 118.

In this form of invention in order to chuck a file it is necessary to remove the cup 109 from position. The cup is merely retained by the ball 110 seated in the notch 111 so that it may be easily pulled off. The jaw 105 is loosely disposed in the notch and can be removed. The cup 109 is then replaced and a file is placed in the notch 102 where it is clamped by the screw 113.

The chucks shown and described above may be made very inexpensively. They give 90° adjustment for a saw as above described in a most inexpensive manner. No other adjusting mechanism is necessary; thus greatly reducing the overall cost of a saw equipped with such a chuck.

Preferred forms of the invention have been shown and described. However, they have been shown and described merely by way of illustration and without any intention of limiting the invention to the specific form shown and described.

I claim:

1. In a machine tool the combination of a cylindrical chuck body having a longitudinally-extending notch therein formed by substantially radially-extending walls at 90° to one another, a chuck jaw comprising a cylindrical segment having a pair of flat walls at 90° to one another, which, with said chuck body, substantially forms a cylinder, a ring surrounding said chuck body and jaw, a screw threaded in said ring and bearing on said jaw to force it into clamping engagement in said notch a saw clamped in said notch and having flat sides and a cutting edge, one flat side lying against one of the said walls of said notch and the other flat side engaging one of the walls of said chuck jaw, said saw being shiftable on unclamping to engage the other wall of said notch for 90° adjustment of its cutting edge and means for retaining said chuck jaw within said ring.

2. In a machine tool the combination of a chuck body having a longitudinally-extending notch therein formed by walls at 90° to one another and extending from substantially the center of the chuck body to the periphery thereof, a V-shaped chuck jaw having walls at 90° to one another and fitting in said notch, means for forcing said jaw into clamping engagement in said notch a saw clamped in said notch and having flat sides and a cutting edge, one flat side lying against one of the said walls of said notch and the other flat side engaging one of the walls of said chuck jaw, said saw being shiftable on unclamping to engage the other wall of said notch for 90° adjustment of its cutting edge.

3. In a machine tool the combination of a chuck body having a longitudinally-extending notch therein formed by walls at 90° to one another and extending from substantially the center of the chuck body to the periphery thereof, a retainer surrounding said chuck body, a V-shaped chuck jaw having walls at 90° to one another and fitting in said notch, a screw threaded in said retainer and bearing on said jaw to force it into clamping engagement in said notch a saw clamped in said notch and having flat sides and a cutting edge, one flat side lying against one of the said walls of said notch and the other flat side engaging one of the walls of said chuck jaw, said saw being shiftable on unclamping to engage the other wall of said notch for 90° adjustment of its cutting edge and means for retaining said chuck jaw within said retainer and means for retaining said retainer in position around said chuck jaw.

4. In a machine tool the combination of a chuck body having a longitudinally-extending notch therein formed by walls at 90° to one another and extending from substantially the center of the chuck body to the periphery thereof, a V-shaped chuck jaw having walls at 90° to one another and fitting in said notch, a retaining cup surrounding said chuck body and jaw, means for forcing said jaw into clamping engagement in said notch a saw clamped in said notch and having flat sides and a cutting edge, one flat side lying against one of the said walls of said notch and the other flat side engaging one of the walls of said chuck jaw, said saw being shiftable on unclamping to engage the other wall of said notch for 90° adjustment of its cutting edge, said cup having an aperture in register with said chuck body and jaw but being of a size to engage said body and jaw and retain said jaw in position in said notch and means for retaining said cup on said body.

References Cited in the file of this patent

UNITED STATES PATENTS

| | | |
|---|---|---|
| 35,391 | Richards | May 27, 1862 |
| 908,804 | Rhoades | Jan. 5, 1909 |
| 1,969,827 | Tautz | Aug. 14, 1934 |
| 1,984,500 | Tautz | Dec. 18, 1934 |
| 2,286,530 | Forden | June 16, 1942 |
| 2,355,286 | Fink | Aug. 8, 1944 |
| 2,472,040 | Brookfield | May 31, 1949 |